United States Patent
Kornefalk

(10) Patent No.: US 7,389,115 B2
(45) Date of Patent: Jun. 17, 2008

(54) METHOD FOR HANDLING SERVICE REQUESTS IN A MOBILE TELECOMMUNICATION NETWORK

(75) Inventor: Bjorn Kornefalk, Arsta (SE)

(73) Assignee: Smarttrust AB, Stockholm (SE)

( * ) Notice: Subject to any disclaimer, the term of this patent is extended or adjusted under 35 U.S.C. 154(b) by 9 days.

(21) Appl. No.: 11/175,487

(22) Filed: Jul. 6, 2005

(65) Prior Publication Data
US 2006/0019685 A1 Jan. 26, 2006

(30) Foreign Application Priority Data
Jul. 20, 2004 (SE) .................................. 0401914

(51) Int. Cl.
*H04Q 7/20* (2006.01)
(52) U.S. Cl. ...................... 455/466; 455/412; 455/455; 709/239; 705/14
(58) Field of Classification Search ................ 455/466, 455/445, 422
See application file for complete search history.

(56) References Cited

U.S. PATENT DOCUMENTS 6,560,456 B1 * 5/2003 Lohtia et al. ............... 455/445
7,127,264 B2 * 10/2006 Hronek et al. .............. 455/466

* cited by examiner

*Primary Examiner*—Charles N Appiah
*Assistant Examiner*—Amancio Gonzalez
(74) *Attorney, Agent, or Firm*—Rolf Fasth; Fasth Law Offices

(57) ABSTRACT

The method of the invention handles a request message from a mobile station to a content provider in a network comprising at least said mobile station, said content provider and a radio system with a first component for directing messages sent from and to mobile stations and a second component having routing information. In the method, the mobile station sends a request message to the content provider via said radio system. The request message is received by said first component for directing messages of said radio system, which first component fetches routing information from said second component. Thereafter, or simultaneously with said fetching of the routing information, the radio system forwards the request message to said content provider, which sends a reply message to the mobile station to said request via said radio system.

6 Claims, 3 Drawing Sheets

METHOD FOR HANDLING SERVICE REQUESTS IN A MOBILE TELECOMMUNICATION NETWORK

TECHNICAL FIELD

Figure 1:
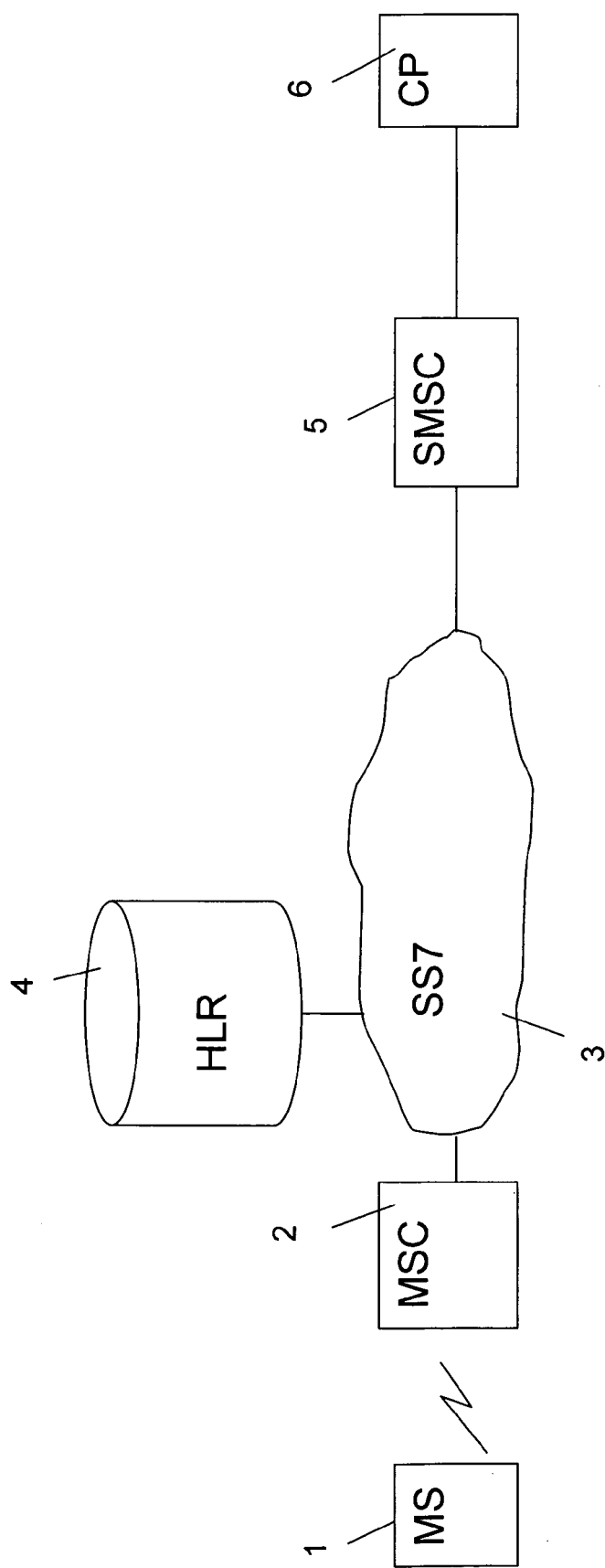

The invention is concerned with a method for handling service requests in a mobile telecommunication network, more in detail a method for handling a request message from a mobile station to a content provider.

BACKGROUND ART

The Global System for Mobile Communication (GSM) is a standard for digital wireless communications. In the GSM radio system, the mobile handset is called Mobile Station (MS).

GSM has much more services than just voice telephony. Today's second-generation GSM networks deliver high quality and secure mobile voice and data services (such as SMS/Text Messaging) with full roaming capabilities across the world.

In mobile networks people can be contacted by calling to their mobile telephone number or by sending to that number a so called short message by e.g. making use of the Short Message Service (SMS). Short Message Service (SMS) is the transmission of short text messages, to and from a mobile phone, fax machine and/or IP address. SMS messages must be no longer than 160 alphanumeric characters and contain no images or graphics. The point-to-point Short message service (SMS) provides a means of sending messages of limited size to and from GSM mobiles. Detailed information can be found in the ETSI standard GSM 03.40 Version 5.3.0.

The basic network structure of the SMS service comprises two entities, which may receive or send messages being the endpoints between which the SMS message is sent. The entity can be located in a fixed network, a mobile station or an internet protocol network.

A further component in the SMS network is the Mobile Switching Centre (MSC), which performs the switching functions of the system and control calls to and from other telephone and data systems. Its most important functions are registration, updating of registration of whereabouts, handovers and roaming. MSC is thus an interface between the radio system and various external networks, such as the public switched telephone network and packet switched Networks. The MSC performs all signaling functions that are necessary to establish calls to and from mobile stations. Communication between the different function authorities is based on signaling system # 7 (SS7). An MSC that also handles the Gateway function into other networks is called Gateway-MSC (GMSC).

Messages sent to and from mobile stations are received by a Short Message Service Centre (SMSC), which must then direct it to the appropriate mobile device if the message is to be sent to a mobile station or it must generally direct it to a recipient. Before attempting delivery of a short message to a mobile device, the SMSC must receive routing information to determine the serving Mobile Switching Centre (MSC) for a given mobile station at the time of the delivery attempt. In order to receive the routing information, the SMSC sends a routing request for SMS to the home location register (HLR) to find the customer. Once the HLR receives the request, it will respond to the SMSC with the subscriber's status (either inactive or active) and the location for where the subscriber is roaming. The SMSC then transfers the message to the serving MSC, which deliver the message to the receiving subscriber. Recipients can then send a response message in a corresponding way.

The SMS gateway MSC (SMS-GMSC) is an MSC capable of receiving a short message from an SMSC, interrogating a home location register (HLR) for routing information, and delivering the short message to the "visited" MSC of the recipient mobile station.

The Home Location Register (HLR) is a database used for permanent storage and management of subscriptions and service profiles. Upon interrogation by the SMSC, the HLR provides the routing information for the indicated subscriber.

The Visitor Location Register (VLR) is a database that contains temporary information about subscribers and local subscriber capabilities. This information is needed by the MSC in order to serve visiting subscribers.

A Mobile Station (MS) is a wireless terminal capable of receiving and originating short messages as well as voice calls being an endpoint to or from which the SMS message is sent.

The backbone of the wireless network signaling infrastructure is based on Signaling System No 7 (SS7). SS7 is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wireline call setup, routing and control. The SS7 network and protocol are used for e.g. basic call setup, management, wireless services, wireless roaming, and mobile subscriber authentication, enhanced call features thus providing efficient and secure worldwide telecommunications.

SMS comprises two basic point-to-point services, i.e. the Mobile-Originated Short Message (MO-SM) and the Mobile-Terminated Short Message (MT-SM)

Mobile-originated (MO) short messages are transported from the MO-capable handset to the SMSC and can be destined to other mobile subscribers or for subscribers on fixed networks or Internet protocol (IP) networks (including the Internet and private e-mail networks). Mobile-terminated (MT) short messages are transported from the SMSC to the handset and can be submitted to the SMSC by other mobile subscribers via MO-SM or by other sources such as voice-mail systems or operators.

For MT-SM, a report is always returned to the SMSC either confirming the short message delivery to the handset or informing the SMSC of the short message delivery failure and identifying the reason for failure (cause code). Similarly, for MO-SM, a report is always returned to the handset either confirming the short message delivery to the SMSC or informing of delivery failure and identifying the reason.

Some of the potential applications of SMS technology, utilizing both MT-SM and MO-SM where appropriate, include Notification Services such as voice/fax message notification, e-mail notification, and reminder/calendar services, e-mail interworking, paging interworking, information services, such as weather reports, traffic information, entertainment information (e.g., cinema, theatre, concerts), financial information (e.g., stock quotes, exchange rates, banking, brokerage services), and directory assistance and WAP integration.

SMS can support both (MT) and (MO) approaches to allow not only delivery under specific conditions but also delivery on demand, as a response to a request.

The ETSI standard 3GPP TS 29.002 V3.10.0 Mobile Application Part (MAP) specification specifies the scenarios for mobile-terminated as well as mobile-originated short messages. Other standards referred to are The ETSI standard 3GPP TS 23.040 5.3.0 Technical realization of the Short message Service (SMS) and The ETSI standard 3GPP TS 23.003 4.3.0 Numbering, Addressing and Identification.

The GSM network was, however, never designed to handle interactive usage of SMS. Interactive SMS usage of the GSM network is most often slow because of the lack of support for these types of applications, such as many mobile service applications, wherein interactive signaling is used.

A common scenario in a mobile service application is the sending of a short message by a mobile station, such as a service request, and the sending of a reply for the request.

Thus, the problem with e.g. a mobile originated short message coming from a handset is that the information required to quickly send back the answer is not available. To be able to send back the answer, the Short Message Service Centre (SMS-C) must first request routing information from the HLR and not until then it can forward the short message to the right MSC.

THE OBJECT OF THE INVENTION

The object of the invention is a more efficient way of handling the reply messages in which the prior art time problems are avoided.

SUMMARY OF THE INVENTION

The method of the invention handles a request message from a mobile station to a content provider in a network comprising at least said mobile station, said content provider and a radio system with a first component for directing messages sent from and to mobile stations and a second component having routing information. In the method, the mobile station sends a request message to the content provider via said radio system. The request message is received by said first component for directing messages of said radio system, which first component fetches routing information from said second component. Thereafter, or simultaneously with said fetching of the routing information, the radio system forwards the request message to said content provider, which sends a reply message to the mobile station to said request via said radio system.

The advantageous embodiments of the invention have the characteristics of the subclaims.

The invention is advantageously implemented in a GSM network by making use of the SMS service scenario. In this scenario, Mobile-originated (MO) short messages are transported from the MO-capable handset to the SMSC and can be destined to other mobile subscribers or for subscribers on fixed networks or Internet protocol (IP) networks (including the Internet and private e-mail networks). For MO-SM, a report is always returned to the handset either confirming the short message delivery to the SMSC or informing of delivery failure and identifying the reason. When the invention is implemented in this scenario, the SMSC handles the gateway functions of the invention and the content provider is e.g. an entity in an internet protocol network (IP).

When the SMS-C receives a MO-SM, there is no reason to search routing information of the sending MS. The routing information is needed when a MT-MS shall be sent. Most often the SMS is sent from one mobile station to another, whereby routing information to the receiving MS is needed. As in the scenario of the invention, the SMS is sent to a content provider (CP), and it takes time before the reply from the CP comes, the routing information from HLR can be requested simultaneously as the SMS is sent to the CP.

By requesting the routing information as soon as the short message arrives to the SMS-C, the SMS-C will win time while the other system components is compiling the proper answer and the HLR is sending the routing information. The time decrease won is in the order of 0.1-1 seconds (depending on the CP and the load of the SS7 network). Normally it takes ca 5 seconds to send an SMS.

In the following the invention will be described by means of some advantageous embodiments with reference to figures implemented to the SMS service in a GSM network. The intention is not to restrict the invention to the details of these embodiments, which are presented for illustrative purposes only and the idea of the invention could equally be implemented to other networks than the GSM.

FIGURES

FIG. 1 presents a part of the basic network structure of a GSM system and the SMS service system, in which the method of the invention can be implemented.

Figure 2:
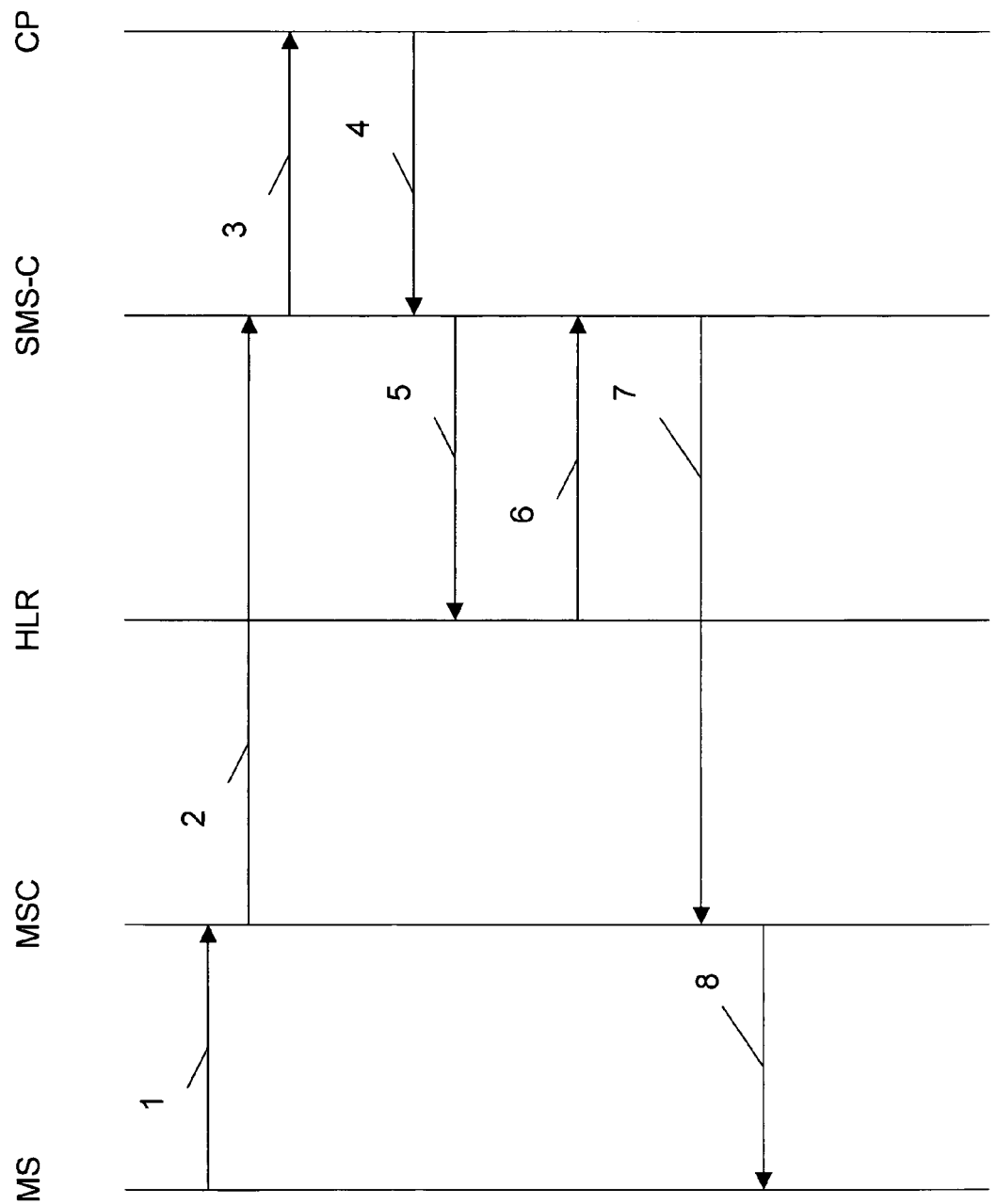

FIG. 2 presents the mobile originated short message transfer procedure of prior art.

Figure 3:
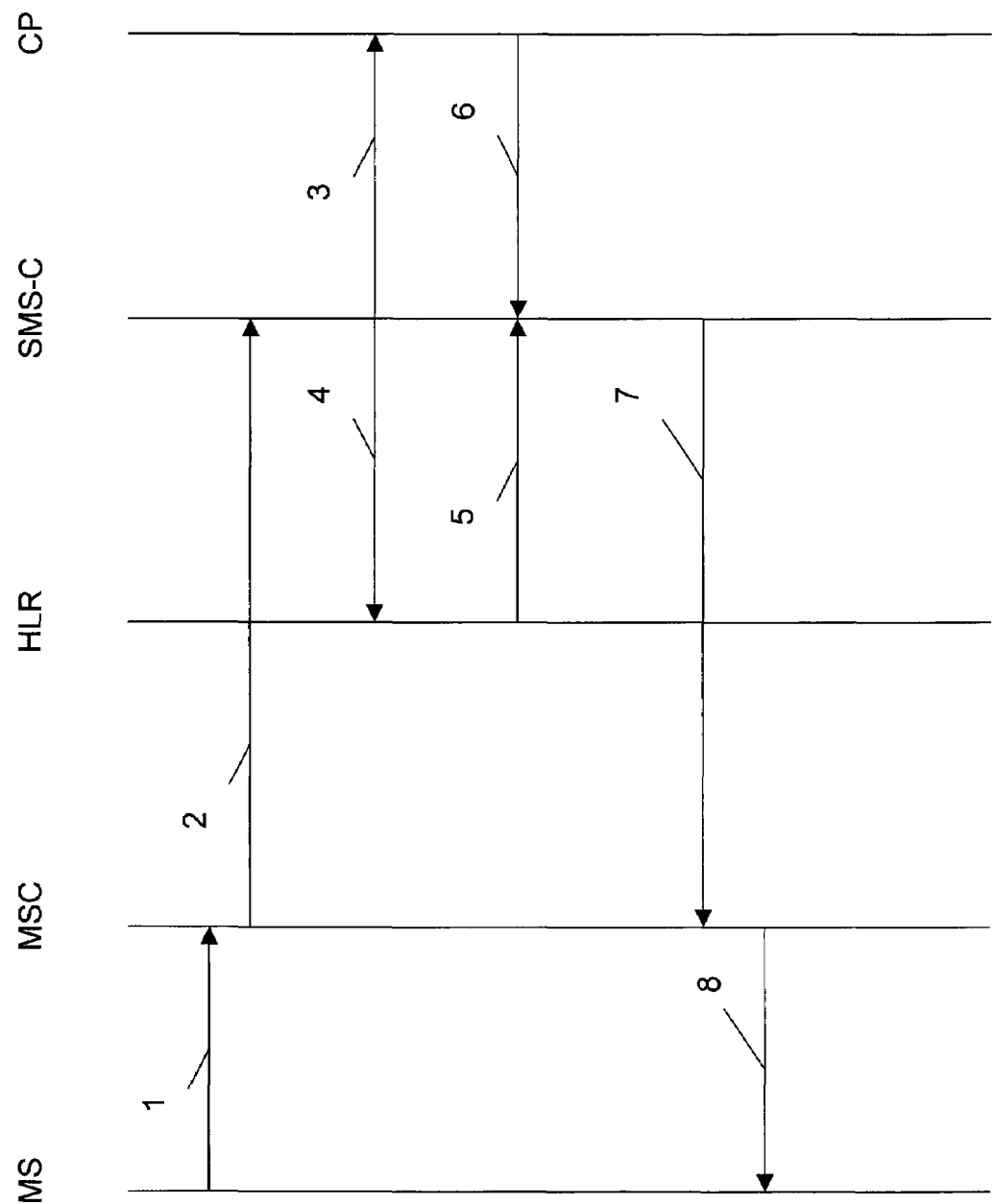

FIG. 3 presents the method of invention for handling a request message from a mobile station to a content provider.

DETAILED DESCRIPTION

FIG. 1 is an architectural view of a part of the existing basic network structure of the SMS service in the GSM network, in which the method of the invention can be implemented for handling a request message in form of a short message from a mobile station to a content provider outside the GSM network.

To make the presentation clearer, FIG. 1 presents only those components, which are relevant to understand the invention. Thus, the second part of the GSM system, i.e. the Base Station Subsystem (BSS) controlling the radio link with the Mobile Station and comprising the Base Transceiver Station (BTS) and the Base Station Controller (BSC) are not presented.

The first part of the GSM network, the Mobile Station (MS) having reference number 1 in FIG. 1 is carried by the subscriber.

The third part of the GSM system is The Network Subsystem, the main part of which is the Mobile services Switching Centre (MSC) with reference number 2 in FIG. 1. It performs the switching of calls between the mobile and other fixed or mobile network users, as well as management of mobile services, such as authentication.

In the SMS service provided by the GSM system, a short message can be sent from the mobile station (MS) 1. The Mobile Switching Centre (MSC) 2 performs the signaling functions that are necessary to send the message further. The communication from MSC 2 further is based on signaling system no. 7 (SS7) protocol, which is indicated with reference number 3 in the figure.

The Home Location Register (HLR) with reference number 4 is a database used for permanent storage and management of subscriptions and service profiles. Upon interrogation by the SMSC 5, the HLR 4 provides the routing information for the indicated subscriber.

The signal containing the SMS message sent originally from the MS 1 is forwarded from MSC 2 by means of the signaling protocol SS7 to the Short Message Service Centre (SMSC) with reference number 5, the function of which is to relay, store and forward short messages between the sender and the recipient. The SMSC 5 delivers the message, which here is a service request, to a content provider (CP) indicated with reference number 6 in FIG. 1. The CP 11 might be situated in e.g. an IP network.

Further components belonging to the GSM network but not shown in FIG. 1 is The Visitor Location Register (VLR) containing temporary information about visiting subscribers and the Gateway-MSC (GMSC) that handles all messages to destinations in other networks such as the Public Switched Telephone Network (PSTN) or (ISDN).

The response to the MS 1 from the CP 6 is received by SMSC 5, which must then direct it to the appropriate mobile device. Before attempting delivery of the short message, the SMSC 5 must receive routing information to determine the right serving Mobile Switching Centre (MSC) 2 for the mobile device 1 at the time of the delivery attempt.

In order to receive the routing information, the SMSC 5 sends routing request information for SMS to the HLR 4 to find the roaming customer. Once the HLR 4 receives the request, it will respond to the SMSC 5 with the subscriber's status (either inactive or active) and the location for where the subscriber is roaming. The SMSC 5 then, after having received the location information for the MS 1, transfers the message to the serving MSC 2, which deliver the message to the receiving subscriber, i.e. the MS 1.

FIG. 2 generally presents the Mobile-Originated Short Message (MO-SM) service of prior art, which is one of the point-to-point SMS services according to The ETSI standard 3GPP TS 29.002 V3.1.0.0 Mobile Application Part (MAP) specification.

In FIG. 2, the mobile station (MS) sends a short message directed to a content provider CP in another network, such as an IP network. The message is first sent to the radio system, where it is received by the Mobile Switching Centre (MSC) in step 1 of FIG. 2. The MSC interrogates the VLR to verify that the message transfer does not violate the supplementary services invoked or other restrictions imposed. The VLR, which keeps control of visiting subscribers would know if e.g. a given mobile station would not be allowed to receive short messages.

In step 2, the MSC sends the message further to the SMSC. In step 3, the SMSC then delivers the short message to the content provider (CP). The message is sent, even if not shown in the figure, by means of the signaling protocol SS7 via a Gateway-MSC (GMSC) that handles all messages to destinations in other networks being an interface between MSC and other networks.

In step 4, the content provider (CP) sends a reply message back. This reply first arrives to the SMS-C. SMS-C needs routing information of which MSC serves the mobile station in order to send the reply back to the mobile station. This routing information is fetched from the HLR in steps 5 and 6 of FIG. 1.

The SMSC then sends the reply further to the MSC in step 7 and the MSC forwards it to the MS in step 8. This informs the successful outcome of the mobile-originated Short Message operation.

FIG. 3 presents the method of the invention for handling request messages implemented in the SMS service scenario of the GSM network, the request message being sent as a short message. Steps 1-3 are in this implementation equal to those in FIG. 2, i.e. the mobile station (MS) sends a short message, which in this example is a service request to a content provider in another network, e.g. an IP network, such as internet, via to the mobile switching centre (MSC) in steps 1-3. In step 3, the MSC delivers the short message to the content provider (CP).

The content provider (CP) will send a reply message back to the SMS-C. SMS-C needs routing information of which MSC serves the mobile station in order to send the reply further to the mobile station. This routing information is fetched from the HLR in steps 4 and 5 of FIG. 1 already before the reply message, i.e. signal 6, from CP arrives to the SMS-C.

The SMSC then sends the reply further to the MSC in step 7 and the MSC forwards it to the MS in step 8.

The invention claimed is:

1. A method for handling a request message from a mobile station to a content provider in a telecommunication network, comprising:
   requesting mobile station sending a request message to a mobile switching center (MSC),
   the MSC forwarding the request message to a short message service center (SMSC),
   upon receipt of the request message from the MSC, the SMSC requesting routing information, to the requesting mobile station, from a home location register (HLR),
   the SMSC forwarding the request message to the content provider,
   the HLR sending the requested routing information to the SMSC and the SMSC receiving the requested routing information from the HLR,
   the content provider sending a reply message, in response to the request message, to the SMSC,
   the SMSC receiving the reply message from the content provider after receiving the routing information from the HLR, and
   the SMSC using the requested routing information to forward the reply message to the requesting mobile station via a telecommunication network.

2. The method according to claim 1 wherein the request message is a short message service (SMS) message.

3. The method according to claim 1 wherein the method further comprises the SMSC determining the request message is a service request for a content provider prior to forwarding the request message to the content provider.

4. The method according to claim 1 wherein the telecommunication network is a GSM network.

5. A method for handling a request message from a mobile station to a content provider in a telecommunication network, comprising:
   requesting mobile station sending a request message to a mobile switching center (MSC), the MSC forwarding the request message to a short message service center (SMSC),
   upon receipt of the request message from the MSC, the SMSC simultaneously requesting routing information from a home location register (HLR) and forwarding the request message to the content provider,
   the HLR sending the requested routing information to the SMSC and the SMSC receiving the requested routing information from the HLR,
   the content provider sending a reply message, in response to the request message, to the SMSC,
   the SMSC receiving the reply message from the content provider after receiving the routing information from the HLR, and
   the SMSC using the requested routing information to forward the reply message to the requesting mobile station via a telecommunication network.

6. A method for handling a request message from a mobile station to a content provider in a telecommunication network, comprising:

requesting mobile station sending a request message to a mobile switching center (MSC), the MSC forwarding the request message to a short message service center (SMSC), upon receipt of the request message from the MSC, the SMSC forwarding the request message to the content provider and immediately thereafter requesting routing information from a home location register (HLR), the HLR sending the requested routing information to the SMSC and the SMSC receiving the requested routing information from the HLR, the content provider sending a reply message, in response to the request message, to the SMSC, the SMSC receiving the reply message from the content provider after receiving the routing information from the HLR, and the SMSC using the requested routing information to forward the reply message to the requesting mobile station via a telecommunication network.

* * * * *